United States Patent
Arseneau

(10) Patent No.: US 8,015,863 B2
(45) Date of Patent: Sep. 13, 2011

(54) CHASSIS DYNAMOMETER HAVING AN EDDY CURRENT BRAKE WITH ADJUSTABLE AIR GAP AND MODULAR COMPONENTS

(75) Inventor: Paul Arseneau, Fort Worth, TX (US)

(73) Assignee: Dynocom Industries, Inc., Fort Worth, TX (US)

( * ) Notice: Subject to any disclaimer, the term of this patent is extended or adjusted under 35 U.S.C. 154(b) by 0 days.

(21) Appl. No.: 11/956,232

(22) Filed: Dec. 13, 2007

(65) Prior Publication Data
US 2008/0209993 A1  Sep. 4, 2008

Related U.S. Application Data

(60) Provisional application No. 60/869,882, filed on Dec. 13, 2006.

(51) Int. Cl.
G01M 17/007 (2006.01)
(52) U.S. Cl. .......................................................... 73/123
(58) Field of Classification Search ............... 73/116.01, 73/116.05, 116.06, 121, 123
See application file for complete search history.

(56) References Cited

U.S. PATENT DOCUMENTS

| | | | | |
|---|---|---|---|---|
| 4,899,595 | A * | 2/1990 | Warsaw | 73/862.14 |
| 5,445,013 | A * | 8/1995 | Clayton et al. | 73/116.06 |
| 5,565,621 | A * | 10/1996 | Selby et al. | 73/54.28 |
| 5,844,145 | A * | 12/1998 | D'Angelo | 73/862.18 |
| 6,457,352 | B1 * | 10/2002 | Knestel | 73/117.03 |
| 6,651,493 | B2 * | 11/2003 | Myers et al. | 73/116.05 |
| 6,938,500 | B2 * | 9/2005 | Beaman et al. | 73/862.49 |
| 7,398,669 | B2 * | 7/2008 | Mahajan et al. | 73/10 |
| 2007/0068220 | A1 * | 3/2007 | Mahajan et al. | 73/9 |

* cited by examiner

*Primary Examiner* — Eric S McCall
(74) *Attorney, Agent, or Firm* — Mark W Handley

(57) ABSTRACT

A chassis dynamometer is disclosed having a dynamometer drum member, a housing member to house a stator, a shoe member to form a gap with the dynamometer drum member, an extension shaft member to radially vary the gap dimension. The extension shaft member may extend radially from the housing member, and the extension shaft member may include external threads. The extension shaft member may include a smooth portion, and the extension shaft member may cooperate with a collar member. The extension shaft member may include a hole member, and the extension shaft member may include a fastening member. The collar member may include a shoulder member, and the extension shaft member may include a flange member.

19 Claims, 6 Drawing Sheets

CHASSIS DYNAMOMETER HAVING AN EDDY CURRENT BRAKE WITH ADJUSTABLE AIR GAP AND MODULAR COMPONENTS

CROSS-REFERENCE TO RELATED APPLICATION

The present invention claims priority under 35 USC section 119 based upon the provisional application filed on Dec. 13, 2006 with a Ser. No. 60/869,882.

TECHNICAL FIELD OF THE INVENTION

This invention generally relates to dynamometers and specifically to a chassis dynamometer for vehicles.

BACKGROUND OF THE INVENTION

The art of making various dynamometers has existed for decades. Continuous improvement in the construction of dynamometers for activities including brake testing, performance testing and emissions testing is evidenced by a series of issued patents including U.S. Pat. No. 5,375,461 to Suzuki, U.S. Pat. No. 4,450,728 to D'Angelo et. al., U.S. Pat. No. 4,468,955 to Yamasaki et. al., U.S. Pat. No. 4,688,419 to D'Angelo et al., U.S. Pat. No. 4,870,585 to Manzolini, U.S. Pat. No. 5,010,763 to Schneider, U.S. Pat. No. 3,277,703 to Cline, U.S. Pat. No. 3,554,023 to Geul, U.S. Pat. No. 6,257,054 to Rostkowski et. al., U.S. Pat. No. 5,193,386 to Hesse, Jr. et. al., U.S. Pat. No. 5,844,145 to D'Angelo, U.S. Pat. No. 5,450,748 to Evans et al., U.S. Pat. No. 4,483,204 to Warsaw, U.S. Pat. No. 4,899,595 to Warsaw, U.S. Pat. No. 3,289,471 to Maxwell, U.S. Pat. No. 3,490,276 to Maxwell et. al., U.S. Pat. No. 5,419,192 to Maxwell et. al., U.S. Pat. No. 4,050,299 to Maxwell, U.S. Pat. No. 3,979,950 to Maxwell and U.S. Pat. No. 3,020,753 to Maxwell.

The use of chassis dynamometers for measuring various variables in automotive performance is widely known in the industry. A chassis dynamometer generally includes a frame, at least one set of rollers supported on a frame and a dynamometer attached to the rollers for the purpose of road load stimulation.

For brake testing, general motoring and driving of chassis dynamometer rollers, much less power is required than is necessary for load testing to measure the vehicle power. Frequently, machines use a motor or electric dynamometer that is capable of both functions, i.e. motoring and absorbing power with the chassis dynamometer. However, with the advent of higher horsepower vehicles, it has become necessary to have machines that require greatly oversized motors or electric dynamometers to provide full vehicle power absorption while still providing the lesser power required for driving the rollers. An additional disadvantage of using a large motor or electric dynamometer is the necessity to dissipate heat generated through a resistive load bank or to regenerate the absorbed power as electrical power. Both these functionalities add undesirable complexity and additional cost to the machine.

Accordingly, the need exists for a motoring chassis dynamometer that is very economic in construction. The motoring chassis dynamometer must be modularly built such that the machine may be easily assembled transported and installed as modules. Similarly, if any repair, maintenance or adjustment is required on the chassis dynamometer, the chassis dynamometer may be capable of easy modular disassembly, repair, maintenance and adjustment. Also, the need exists for a chassis dynamometer to provide test performance surpassing the current and anticipated vehicle capability so that tests of vehicle performance, such as brake testing, transmission testing and full engine power testing for higher horsepower vehicles, can be performed without greatly over-sizing the motor or electric dynamometer. The need also exists to offer alternatives to the currently existing dynamometers to provide the same or greater performance by using a reduced size motor and appropriately sized dynamometer. Finally the need exists to construct chassis dynamometers to allow for testing of both low horsepower and high horsepower vehicles by decreasing construction and equipment cost.

There is increasing concern in the United States about the effect of vehicle emissions on air quality. A number of states and local governments have implemented mandatory emissions testing programs to help identify vehicles that are releasing unacceptable levels of harmful emissions.

To conduct emissions testing, dynamometers are typically used to hold the vehicle stationary while its wheels turn.

U.S. Pat. No. 6,886,811 to Spingett discloses a portable dynamometer station with a vehicle mounted lifting assembly. It includes (a) a vehicle, such as a bus, for transporting the dynamometer, (b) a dynamometer with associated monitoring equipment, and (c) a lifting assembly mounted in the vehicle, for transporting the dynamometer from the vehicle to the ground. The lifting assembly includes (i) an upper support beam, (ii) a lower support beam, (iii) a moving trolley on the lower support beam, (iv) a first hydraulic cylinder for moving the lower support beam and the trolley relative to the upper support beam, (v) a second hydraulic cylinder for raising and lowering the dynamometer or other load from the moving trolley, and (vi) a series of pulleys and cables for movement of the lower support beam, the moving trolley, and the dynamometer or other load.

U.S. Pat. No. 6,860,145 to Bergst discloses a motorized chassis dynamometer machine. In one embodiment, the dynamometer machine includes a fixed frame assembly. At least one roller assembly is mounted on the fixed frame assembly. At least one independent motor assembly is connected to each roller assembly. The independent motor assembly is used for driving the roller assembly. At least one independent loading dynamometer assembly capable of measuring the vehicle input power at each roller assembly is coupled to each roller assembly. In a preferred embodiment, the dynamometer assembly is only operable for loading each independent roller assembly, while the motor assembly is operable for driving each independent roller assembly. The machine has at least one motor controller capable of controlling each independent motor assembly and at least one dynamometer controller capable of controlling each independent dynamometer assembly. Each roller assembly, motor controller and dynamometer controller are in turn controlled and manipulated by an overall controller. The dynamometer machine may further include a torque sensor for each motor assembly and each dynamometer assembly. The torque sensors are used to measure torque reaction, each torque sensor independently measuring torque for each of the roller assemblies.

SUMMARY OF THE INVENTION

A chassis dynamometer may include a dynamometer drum member, a housing member to house a stator, a shoe member to form a gap with the dynamometer drum member, an extension shaft member to radially vary the gap dimension.

The extension shaft member may extend radially from the housing member, and the extension shaft member may include external threads.

The extension shaft member may include a smooth portion, and the extension shaft member may cooperate with a collar member.

The extension shaft member may include a hole member, and the extension shaft member may include a fastening member.

The collar member may include a shoulder member, and the extension shaft member may include a flange member.

The dynamometer may include a base member to hold windings, and the dynamometer may include a nonconductive core member.

The dynamometer may include a conductive core member.

DESCRIPTION OF THE DRAWINGS

The invention may be understood by reference to the following description taken in conjunction with the accompanying drawings, in which, like reference numerals identify like elements, and in which.

DETAILED DESCRIPTION OF THE INVENTION

Figure 1:
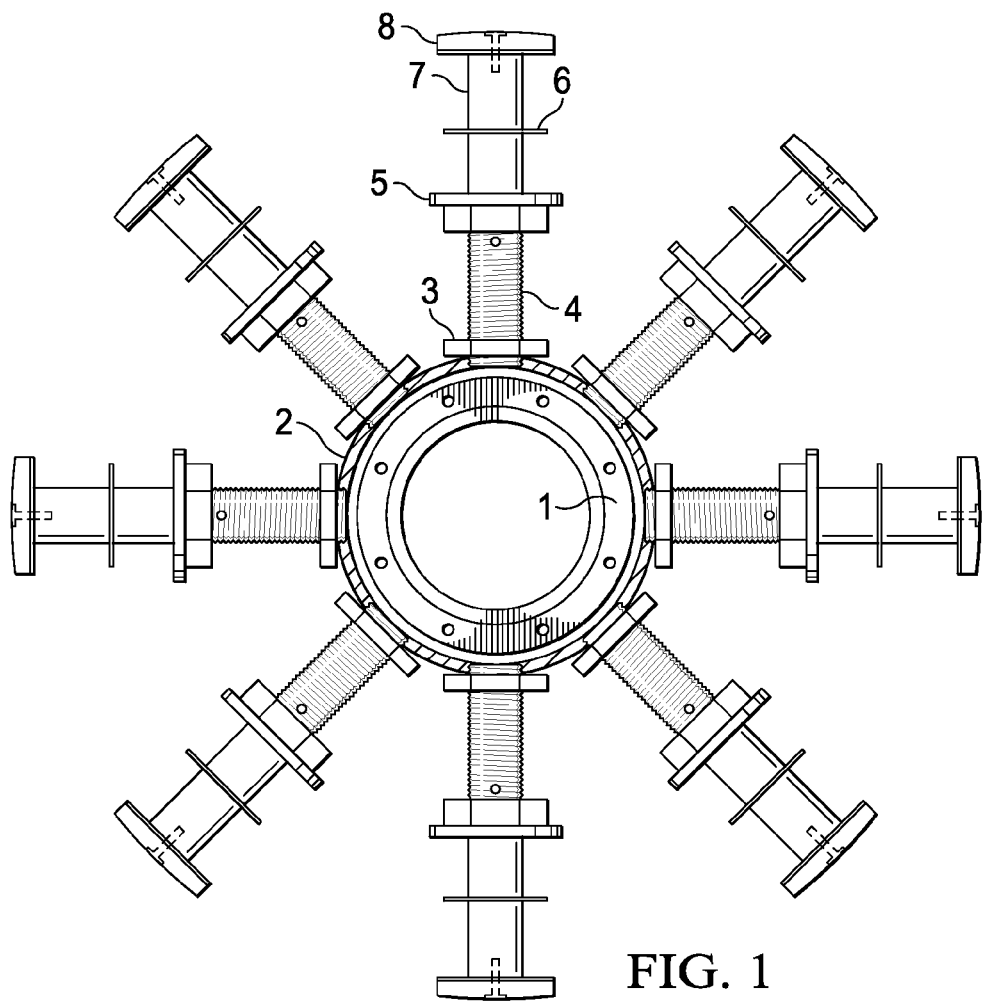
FIG. 1 illustrates a side elevation view of the dynamometer of the present invention.
Figure 2:
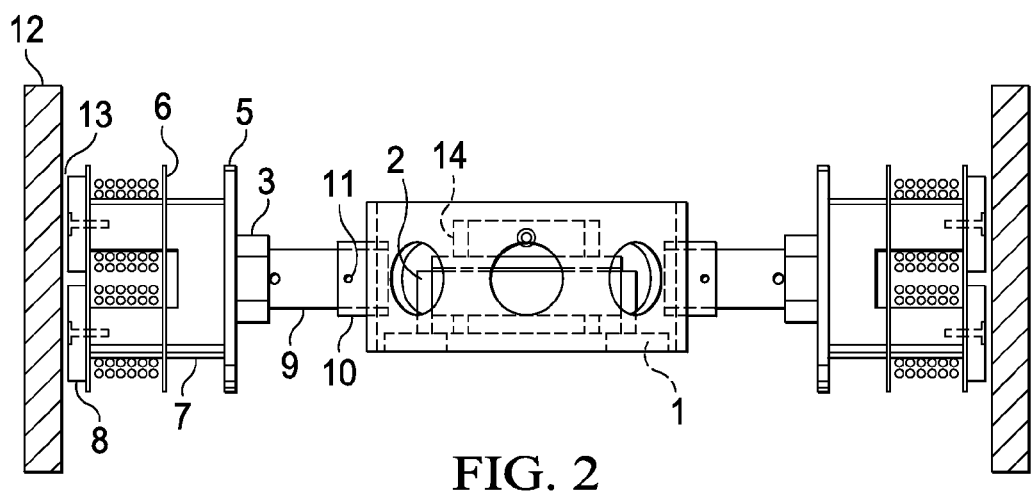
FIG. 2 illustrates a partial top view of the dynamometer of the present invention.

FIG. 1 illustrates a partial, side elevation view of an eddy current brake for use in a chassis dynamometer made according to the present invention (the dynamometer drum 12 is not shown in FIG. 1, see FIG. 2 for the dynamometer drum 12). FIG. 1 shows a modular eddy current break including a stator formed with radially adjustable electromagnets. A rotor is affixed along a shaft. The shaft is adapted to be used with a multitude of chassis dynamometer drums to provide a near optimum braking torque which can be used to simulate inertia and road load forces which are encountered by motor vehicles. Many aspects of the present invention are replaceable (modular) to allow the dynamometer to be adapted for a wide range of different size dynamometer units which may be supplied from different manufacturers and allows for the easy replacement of damaged parts. The modular radial air gap adjustable and the eddy current break system of the present invention includes a stator which may be affixed to the shaft inside the dynamometer drum which may be formed from conductive and nonmagnetic material.

FIG. 1 illustrates a stator housing member 1 for housing the stator, the bearing member 14 which is detachedly connected so that the bearing member 14 can be changed, and the associated stator hub bearing member 2 which is detachedly connected so that the stator hub bearing member 2 can be changed. Consequently, by using different sized bearing member 14, different shaft sizes can be employed, and bearing member 14 can be replaced if damaged. The extension shaft member 4 extends radially from the housing member 1 and includes external threads which are shown as being continuous from one end of the extension shaft member 4 to the opposing end of the extension shaft member 4. FIG. 1 additionally illustrates a fastening member 3 to fasten the extension shaft member 4 to the bearing hub member 2. The fastening member 3 includes internal threads to cooperate with the external threads of the extension shaft member 4. As shown in FIG. 1, a number of extension shaft members 4 may be included with the present invention.

FIG. 2 illustrates that the extension shaft member 4 of FIG. 1 may be replaced by a second extension shift member 9 which is not continuously threaded. FIG. 2 also illustrates a shaft collar member 10 which is affixed to the second extension shift member 9 and to the housing member 1.

FIG. 1 illustrates an inner base member 5 which is shown as a disk with a center hole which includes internal threads to cooperate with the external threads of the extension shaft member 4 so that the inner base member 5 is detachably connected to the extension shaft member 4. The inner base member 5 holds windings on the core member 7. The core member 7 is detachably connected to the inner base member 5 so that a smaller or larger core member 7 may be placed on the inner base member 5. A nonconductive core member 6 which is shown as a disk around the core member 7 which may be formed from iron or other suitable conductive material.

The inner base member 5 is affixed to the proximal end of the core member 7. A magnetic shoe member 8 is affixed to the opposing and distal end of the core member 7. The magnetic shoe member 8 is illustrated as a disk centrally affixed to the core member 7.

FIG. 2 illustrates a portion of the dynamometer drum 12 which is positioned a predetermined distance 13 from the magnetic shoe member 8. The distance 13 defines a radial air gap between the dynamometer drum 12 and the magnetic shoe member 8.

FIG. 2 illustrates a partial top view of the present invention including a partial section view of the dynamometer drum member 12 which cooperates with the magnetic shoe member 8 and is separated by the gap 13 which can be increased or decreased in accordance with the teachings of the present invention. The magnetic shoe member 8 is connected to the core member 7 by fastening devices such as screws or bolts, and the core member 7 is connected to the inner base member 5. The core member 7 is partitioned by the nonconductive core member 6, and the inner base member 5 is detachably connected to a distal end of the extension shift member 9. The gap 13 between the dynamometer drum member 12 and the magnetic shoe member 8 can be adjusted to be larger or smaller based upon moving the inner base member 5 either inwards or outwards along the threads of the extension shaft member 4 (shown in FIG. 1) which has continuous threads or the extension shaft member 9 (shown in FIG. 2) which does not have continuous threads. The extension shaft member 9 is connected to the shaft collar member 10 which connects the extension shaft member 9 to the housing member 1. The housing member 1 houses the bearing hub member 2 and the bearing member 14.

Figure 3A:
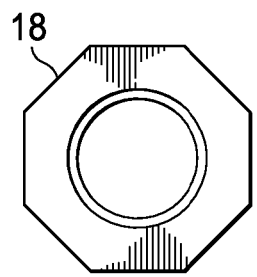
FIG. 3a illustrates a top view of the collar member.

FIG. 3a illustrates a top view of the collar member 18 which is shown as being hexagonal in shape. Other shapes are within the scope of the present invention.

Figure 3D:
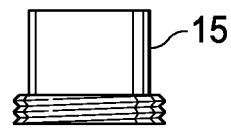
FIG. 3d illustrates a side view of the threaded cap member.
Figure 3B:
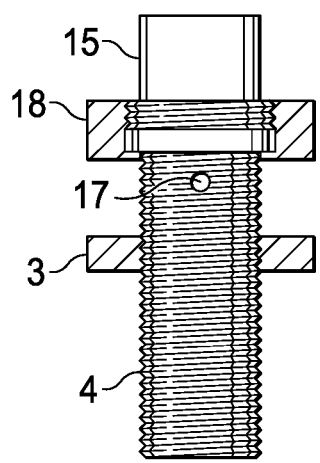
FIG. 3b illustrates a side view of the extension shaft member.

FIG. 3b illustrates a side view of the extension shaft member 4, the collar member 18 and a fastening member 3 with the hole member 17.

Figure 3E:
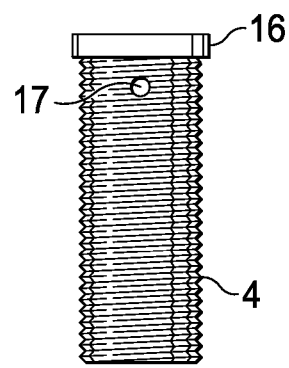
FIG. 3e illustrates a side view of the extension shaft member.
Figure 3C:
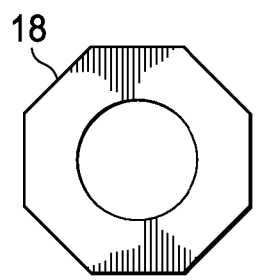
FIG. 3c illustrates a bottom view of the collar member.

FIG. 3c illustrates a bottom view of the extension shaft member 4 with the collar member 18.

FIG. 3d illustrates a side view of the threaded cap member 15.

FIG. 3e illustrates a side view of the threaded cap member 15 and the extension shaft member 4.

Figure 3F:
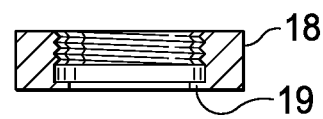
FIG. 3f illustrates a side view of the collar member.

FIG. 3f illustrates the collar member 18 with the shoulder member 19.

Figure 3G:
FIG. 3g illustrates a side view of the fastening member.

FIG. 3g illustrates the fastening member 3 to fasten the extension shaft member 4 to the bearing hub member 2.

The threaded extension shaft member 4 may be utilized to extend the electromagnetic radially. One end of the threaded extension shaft member 4 threads into the bearing housing member 1. The extension shaft member 4 includes a flange member 16 which may be unthreaded and positioned at one end of the extension shaft member 4. The extension shaft member 4 may include a hole member 17 for fastening the extension shaft member 4 on the bearing housing member 1. The collar member 18 slides over the extension shaft member 4. Furthermore, the collar member 18 includes a shoulder member 19 to provide a limit to prevent the collar member 18 from sliding beyond the flange member 16. The collar member 18 may be threaded with a larger diameter opening than that of the extension shaft him member 4 at the end which is opposed to the shoulder member 19. The cap member 15 may be threaded to match the threads on the collar member 18. Electromagnetic cores may be placed on the cap member 15 via the base member 5. A fastening member 3 holds to the extension shaft member 4 to the housing member 1. The cap member 15 is tightened to the collar member 18 so that the extension shaft member 4 can be adjusted upward and downward while rotating independently of the collar member 8 and the cap member 15. The cap member 15 and the electromagnetic assembly (not shown) may be removed by sliding the collar member 18 off the unthreaded flange member 16 should the electromagnets become damaged or needed to be changed for larger or smaller electromagnets as the particular application dictates. This operation allows the magnetic core to be removed while keeping the extension shaft member 4 attached to the housing member 1.

The extension shaft member 4 may be smooth for example having portions which are not threaded. The shaft collar member 10 is attached by welding or pressed into the housing member 1, and the smooth shaft member 9 may be machine to an outside diameter to cooperate with the inside diameter of the shaft collar member 10. The shaft member 9 is held by fastening device 11 which may be set screws placed perpendicular to the axis of extension or via the hoop stress of a shrink fit shaft coupler.

The extension shaft members 4, 9 are adjustable within the constraints of the housing member 1, and the maximum allowable extension of the shaft coupling. The extension shift members 4, 9 may be removed and exchanged to be adapted to the necessary length for manufacturer specifications. Furthermore, the extension shaft member 4, 9 can be removed and replaced should the unit become damaged.

Atop the extension shaft member 4 is an electromagnet with a core member 7 which may be soft iron. The core member 7 may be attached to the extension shaft member 4, 1 via the base member 5. As a consequence, the core member 7 can be removed in exchange with a smaller or larger core member 7 as the application dictates. The core member 7 can be removed and replaced if the core member 7 becomes damaged or fatigued. The core member 7 may be in the form of a U-shaped magnet, a straight magnet, a bar shaped magnet, or a pot core magnet.

Magnetic wires 22 wrapped around the core member 6 are placed outside of the core member 7 to induce a directional current flow through the core member 7 and to create a magnetic flux field around as poles such that it creates an electromagnet 24. The core member 6 may be placed outside of the core member 7 such that they can be removed and exchanged with larger or smaller core members 6 as the application dictates. The core member 6 may be removed and replaced if the core member 6 becomes damaged or fatigued.

The core member 6 may be secured by a radially contoured magnetic shoe member 8 in which the shoe member 8 creates the poles for the electromagnet. The shoe member 8 may be attached to the core member 7 such that the shoe member 8 can be removed and exchanged to allow for utilization of smaller or larger radius magnetic shoe members as the application dictates. The magnetic shoe member 8 may be removed and replaced if the magnetic shoe member 8 should become damaged.

The magnetic shoes 8 are radially contoured which allows the air gap between a stationary electromagnetic array and the conductive rolling dynamometer drums to be minimized. The result is greater denser and more uniform magnetic flux fields between the stationary magnet and the dynamometer drum 12; thus providing a greater braking force on the dynamometer drum 12. The radially contoured magnetic shoe 8 great improves the braking force allowing the dynamometer manufacturers to utilize smaller, less dense dynamometer drums 12 in exchange for electrically simulated inertia. The modular radially contoured magnetic shoe 8 allows for the electromagnet to conform to different diameter dynamometer drums 12 for different applications from different manufacturers.

By creating a radially adjustable air gap 13 which is at a greater radius than traditional eddy current break systems, the amount of braking force applied to the dynamometer drum 12 is near maximized by the equation T=F times.d where T is the braking torque of the eddy current brake, F is the force applied tangentially at the outer edge of the eddy current brake and d is a distance from the center point of the shaft to the edge of the eddy current brake where the force is applied.

By creating an eddy current brake with greater torque, this provides manufacturers with the ability to utilize a system with less windings per coil than traditional eddy current designs thus using a lower wattage in operation.

Additionally less windings per coil equates to a lower weight of the overall unit, adding to the ease of installation.

The modular design of the Eddy current brake described in the present invention allows for easy mounting directly on the output shaft of the dynamometer. This allows the eddy current brake to be utilized without the need of additional couplers, joints, belts pulleys etc.

Figure 4:
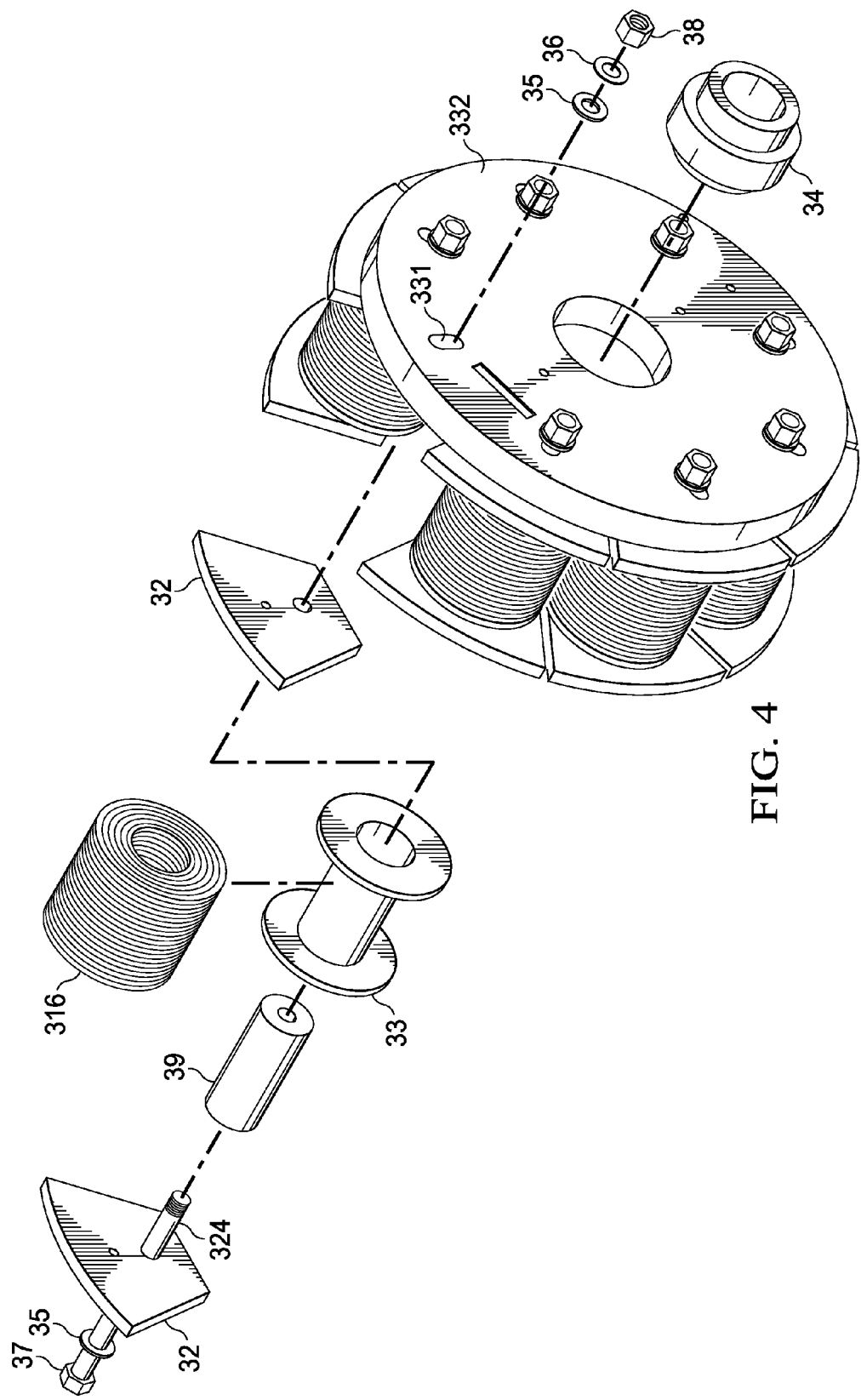
FIG. 4 illustrates an exploded view of a second embodiment of the present invention.

FIG. 4 illustrates an another embodiment of the present invention which includes a plurality of parallel coil members 316 which are coupled to a carrier member 332 by radial slot member 331 and which is a radial slot in the surface of the carrier member 332 and extends through the carrier member 332. Each of the radial slots is substantially equally distant from the center of the carrier member 332 with the longitudinal direction of the radial slot being in the radial direction. This allows the individual coil member 316 to be moved in the radial direction within the radial slot of the radial slot member 331. A rod member 324 extends through a sleeve member 39 and which extends through a carrier member 332 to hold the coil member 316. The rod member 324 extends through a pair of pole members 32 which are positioned on opposing ends of the coil member 316. The rod member 324 extends through the sleeve member 39 which extends through the carrier member 332 and extends through the radial slot member 331 and is detachably connected to the carrier member 332 by a fastening device 35, 36, 38 which may be spacers and nuts or bolts or other type of fastening devices to fasten the rod member 324 to the carrier member 332. The rod member 324 may be a radially adjusted and to adjust the distance from the center of the carrier member 332 by loosening the fastening device 35, 36, 38 and repositioning the rod member 324 at a new location within the slot member 331. As a consequence, the coil member 316 is individually adjustable radially, either closer or further from the center of the carrier member 332. The pole member 32 includes inwardly sloping sides to allow pole member 332 to cooperate with the adjacent pole member 32 to allow the coil member 316 to be adjusted by moving radially. The pole member 32 and the coil member 316 can be individually adjusted with respect to the interior diameter of the drum (not shown). The carrier member 332 is connected to a bearing member 34 to allow the carrier member 332 to rotate with respect to the drum.

Figure 5:
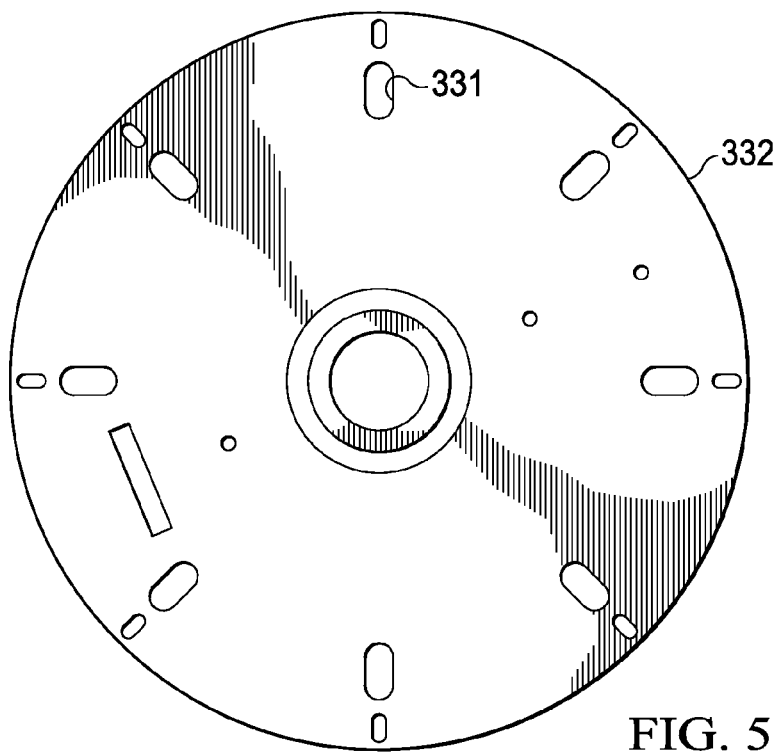
FIG. 5 illustrates a top view of the second embodiment of the present invention.

FIG. 5 illustrates a side elevation view of the carrier member 332, and FIG. 5 illustrates the radial slots 331 which allows movement of the rod member 324 which in turn allows radial adjustment of the coil member 316 and the pole member 32.

Figure 6:
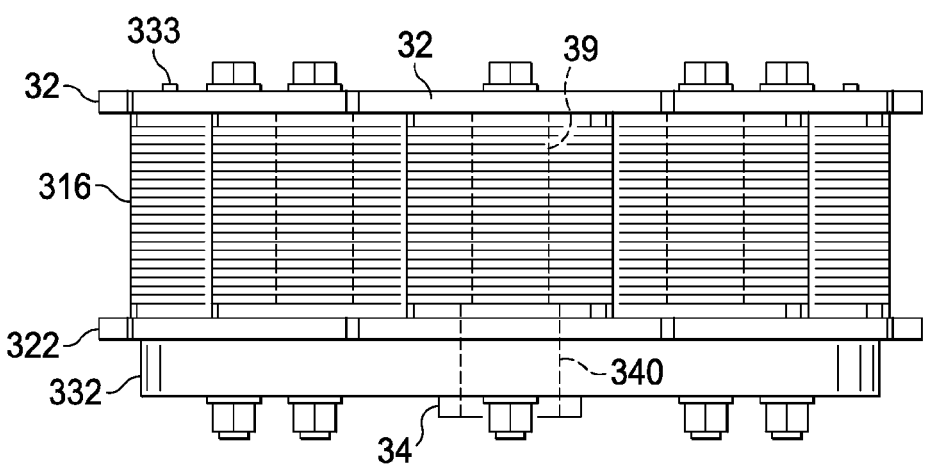
FIG. 6 illustrates a side view of the second embodiment of the present invention.

FIG. 6 illustrates a top view of the carrier member 332 which is connected to a central shaft 340 for rotation. FIG. 6 additionally illustrates the coil member 316, the pole member 32, the bearing member 34, and the sleeve member 39.

Figure 7:
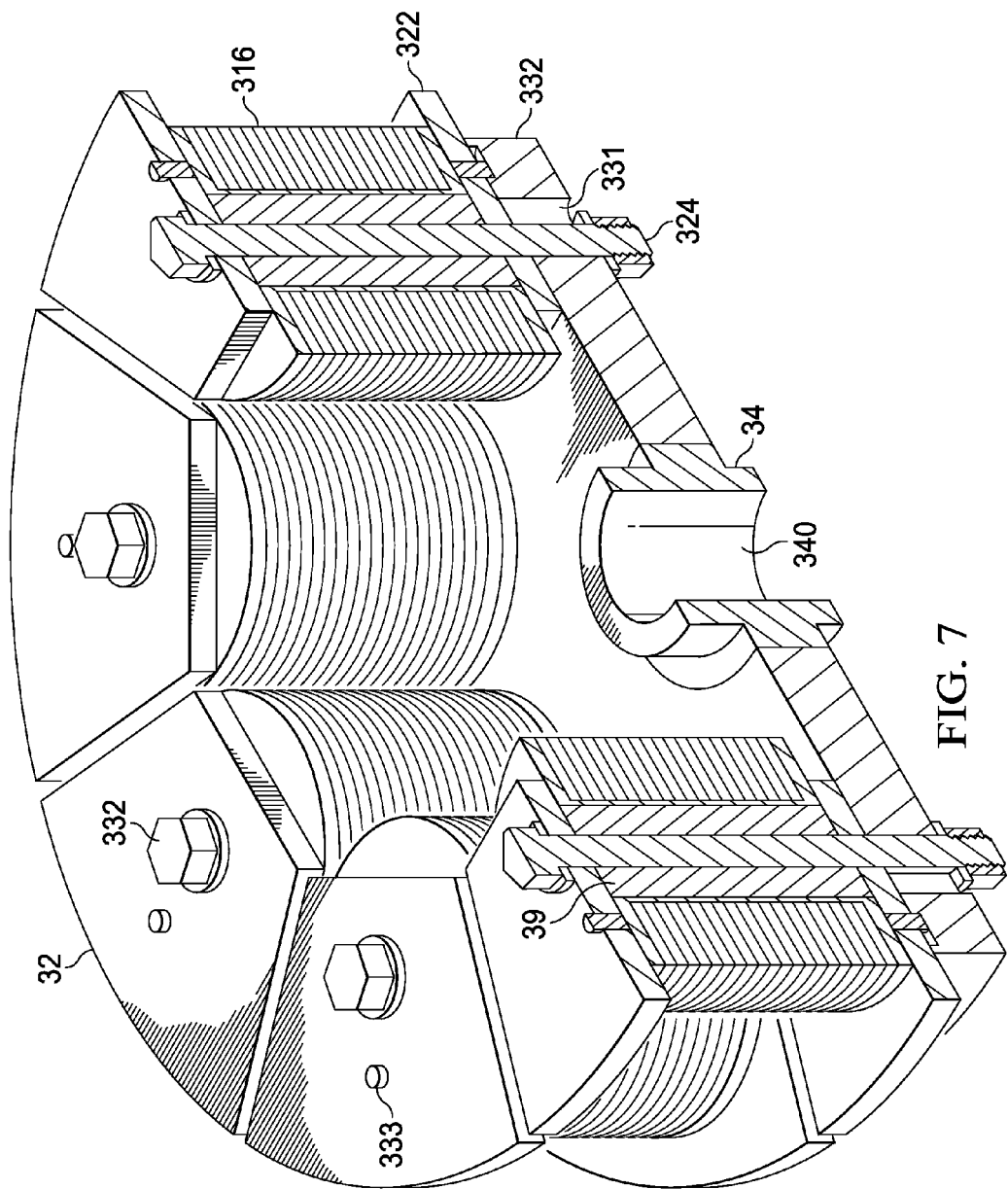
FIG. 7 illustrates a perspective view of the second embodiment of the present invention.

FIG. 7 illustrates a sectional perspective view of the carrier member 332, the rod member 324, the radial slot member 331 and the top pole member 32.

Figure 8:
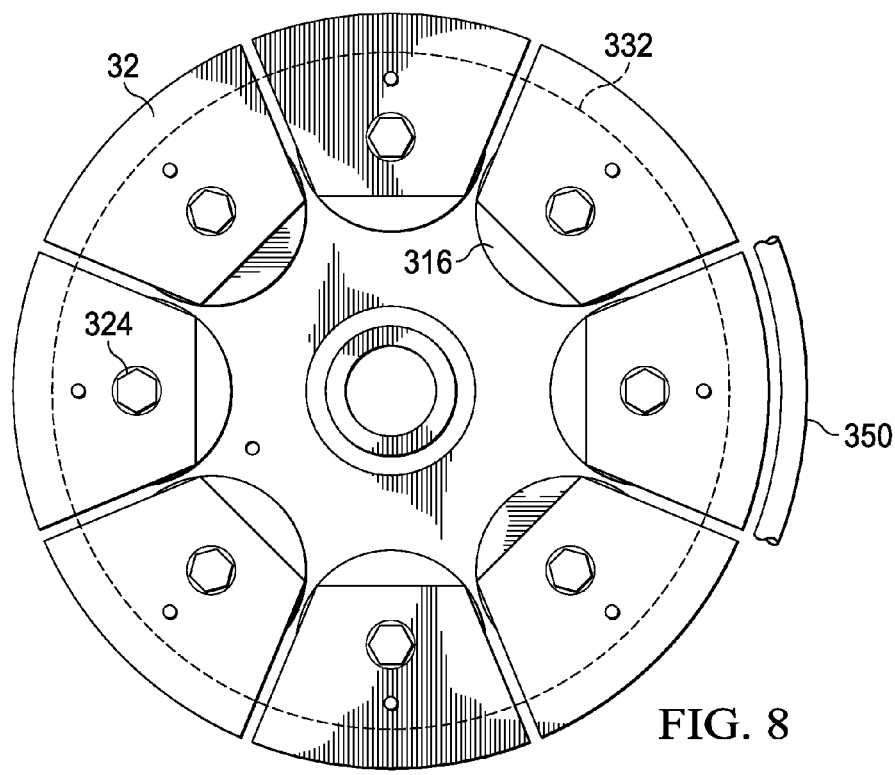
FIG. 8 illustrates a side elevation view of the second embodiment of the present invention.

FIG. 8 illustrates a side elevation view, which shows the bottom pole member 32, the carrier member 332, the coil member 316, a portion of the drum 350 which extends around the perimeter of the carrier member 332 and the rod member 324.

A feeler gauge (not shown) may be used to minimize the air gap between the shoes and drum. Reducing the air gap between the drum in the shoes, strengthens the effect of the eddy currents, increasing the braking torque of the unit. If the air gap is minimized while the drum and shoes are cool, the utilization of the drums and shoes will increase the distance of the air gap due to the expansion of the drum.

Figure 9:
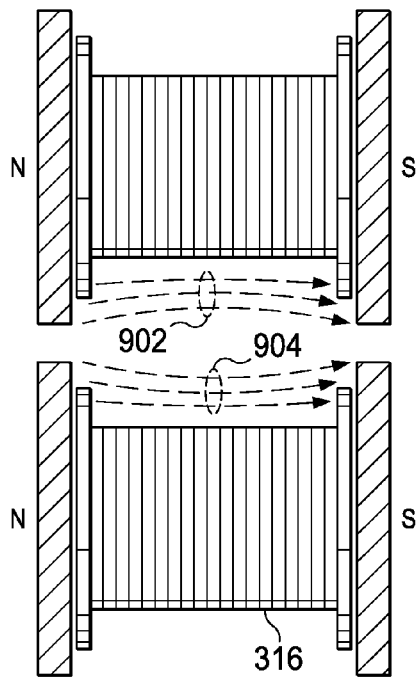
FIG. 9 illustrates a side view of the second embodiment of the present invention, showing magnetic field lines.

FIG. 9 illustrates a pair of coil members 316 which are aligned so that the same poles are adjacent, namely the north pole is adjacent to the north pole and the south pole is adjacent to the south pole. FIG. 9 shows two magnetic field lines 902, 904 which are repelled from each other due to the above poll arrangement. Furthermore, the magnetic fields 902, 904 are very dense in the above arrangement and run substantially perpendicular to the rotating direction of the drum. This substantially increases the effective braking torque. Increasing the magnetic field lines running substantially perpendicular to the drum, results in a stronger eddy current effect and stronger effective braking torque.

Figure 10:
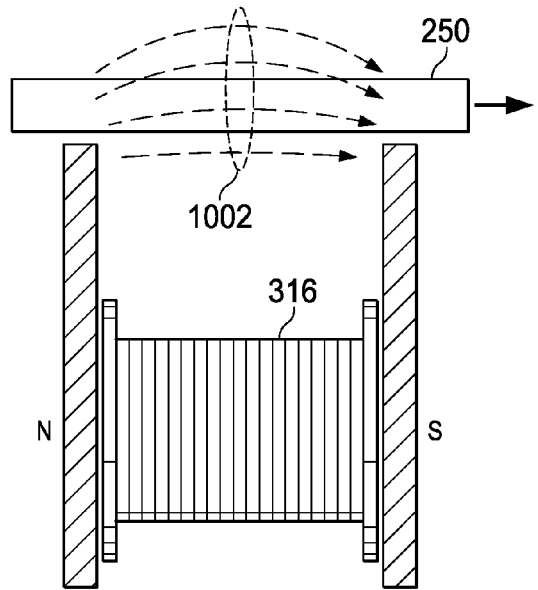
FIG. 10 illustrates another side view of the second embodiment of the present invention, showing magnetic field lines.

FIG. 10 illustrates the side view of the magnetic field lines 1002 showing the drum member 250 and the direction of rotation with respect to the coil member 316.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A chassis dynamometer, comprising:
a dynamometer drum member;
a housing member to house a stator interiorly within said dynamometer drum member:
said stator having electromagnets, said electromagnets having a corresponding shoe member which defines a gap between said stator and the dynamometer drum member; and
said stator further including said electromagnets being mounted to a corresponding extension shaft member to radially vary said gap between said shoe member and said dynamometer drum member.

2. A chassis dynamometer as in claim 1, wherein said extension shaft member extends radially from the housing member.

3. A chassis dynamometer as in claim 1, wherein said extension shaft member includes external threads.

4. A chassis dynamometer as in claim 1, wherein the extension shaft member includes a smooth portion.

5. A chassis dynamometer as in claim 1, wherein the extension shaft member includes a hole member.

6. A chassis dynamometer as in claim 1, wherein the extension shaft member includes a fastening member.

7. A chassis dynamometer as in claim 1, wherein the extension shaft member includes a flange member.

8. A chassis dynamometer as in claim 1, wherein the dynamometer includes a base member to hold wrapped magnetic wires for electromagnets.

9. A chassis dynamometer as in claim 1, wherein the dynamometer includes a nonconductive core member.

10. A chassis dynamometer as in claim 1, wherein the dynamometer includes a conductive core member.

11. The chassis dynamometer according to claim 1, further comprising said electromagnets having corresponding core members and magnetic wires wrapped around respective ones of said corresponding core members.

12. A chassis dynamometer as in claim 1, wherein the extension shaft member cooperates with a collar member.

13. A chassis dynamometer as in claim 12, wherein the collar member includes a shoulder member.

14. The chassis dynamometer according to claim 1, wherein said extension shaft members extend radially outward from said housing member, in spaced apart relation, with said extension shaft members being selectively extendible.

15. The chassis dynamometer according to claim 11, wherein said corresponding core members about which said magnetic wires are wrapped are U-shaped.

16. A chassis dynamometer, comprising:
a dynamometer drum member;
a housing member to house a stator interiorly within the dynamometer drum member;
said stator having electromagnets, said electromagnets having magnetic wires wherein a gap is defined to extend between said stator and said dynamometer drum member; and said stator further including said electromagnets being mounted to a corresponding extension shaft member to radially vary said gap between said stator and said dynamometer drum member.

17. The chassis dynamometer according to claim 16, wherein said extension shaft members extend radially outward from said housing member, in spaced apart relation, with said extension shaft members being selectively extendible.

18. The chassis dynamometer according to claim 17, wherein said magnetic wires are wrapped around corresponding core members, and said core members are U-shaped.

19. The chassis dynamometer according to claim 16, wherein said magnetic wires are wrapped around corresponding core members, and said core members are U-shaped.

* * * * *